United States Patent
Sujan et al.

(10) Patent No.: US 7,805,235 B2
(45) Date of Patent: Sep. 28, 2010

(54) SYSTEM AND METHOD FOR CONTROLLING A FLOW OF INTAKE AIR ENTERING AN INTERNAL COMBUSTION ENGINE

(75) Inventors: Vivek A. Sujan, Columbus, IN (US); Morgan Andreae, Columbus, IN (US); Adrian P. Dale, Columbus, IN (US); Jeffrey A. Matthews, Columbus, IN (US)

(73) Assignee: Cummins Inc., Columbus, IN (US)

( * ) Notice: Subject to any disclaimer, the term of this patent is extended or adjusted under 35 U.S.C. 154(b) by 360 days.

(21) Appl. No.: 12/099,582

(22) Filed: Apr. 8, 2008

(65) Prior Publication Data
US 2009/0250042 A1    Oct. 8, 2009

(51) Int. Cl.
B60T 7/12    (2006.01)
F02M 1/00    (2006.01)

(52) U.S. Cl. ............. 701/103; 701/108; 123/434; 123/568.21

(58) Field of Classification Search ......... 701/103, 701/104, 108, 114; 123/434, 672, 568.11, 123/568.21, 568.26
See application file for complete search history.

(56) References Cited

U.S. PATENT DOCUMENTS

| | | | |
|---|---|---|---|
| 4,377,070 A | 3/1983 | Shadbourne | |
| 4,387,694 A | 6/1983 | Yoshiba et al. | |
| 4,559,917 A | 12/1985 | Toyama et al. | |
| 5,000,666 A | 3/1991 | Esaki | |
| 5,201,300 A | 4/1993 | Iiyama | |
| 5,440,880 A * | 8/1995 | Ceynow et al. | 60/605.2 |
| 6,968,679 B2 | 11/2005 | Pott | |
| 7,066,144 B2 | 6/2006 | Harunari et al. | |
| 7,121,268 B2 | 10/2006 | Andoh et al. | |
| 7,201,121 B2 | 4/2007 | Weber et al. | |
| 2002/0166547 A1* | 11/2002 | Bailey | 123/568.15 |
| 2007/0089706 A1 | 4/2007 | Weber et al. | |
| 2007/0163536 A1* | 7/2007 | Okubo et al. | 123/295 |
| 2008/0120010 A1* | 5/2008 | Asano et al. | 701/102 |

* cited by examiner

Primary Examiner—John T Kwon
(74) Attorney, Agent, or Firm—J. Bruce Schelkopf; Barnes & Thornburg LLP (57) ABSTRACT

A system and method are provided for controlling a flow of intake air entering an internal combustion engine. At least some of the intake air is diverted away from the engine in response to detection of a first operating condition that is indicative of a minimum engine fueling rate. A second operating condition that is indicative of a flow rate of the intake air entering the engine is monitored, and diverting at least some of the intake air away from the engine is discontinued if the second operating condition indicates that the flow rate of the intake air entering the engine is within a threshold value of a target flow rate.

29 Claims, 2 Drawing Sheets

SYSTEM AND METHOD FOR CONTROLLING A FLOW OF INTAKE AIR ENTERING AN INTERNAL COMBUSTION ENGINE

FIELD OF THE INVENTION

The present invention relates generally to internal combustion engines including an air handling system, and more specifically to systems and methods for controlling a flow of intake air entering the engine.

BACKGROUND

When a fueling rate of fuel supplied to an internal combustion engine is rapidly reduced to a minimum engine fueling rate, the flow rate of intake air entering the engine may for some time period remain undesirably high. This condition is exacerbated in turbocharged engines. The resulting high air-to-fuel ratios cause the engine to produce exhaust gas having high oxygen concentration, which may be undesirable in engines that include exhaust gas recirculation systems and/or which may be undesirable in engines that do not include exhaust gas recirculation systems. It is therefore desirable to actively control the flow rate of intake air entering the engine, particularly during engine fueling conditions that may result in the production of exhaust gas having undesirably high oxygen content.

SUMMARY

The present invention may comprise one or more of the features recited in the attached claims, and/or one or more of the following features and combinations thereof. A method of controlling a flow of intake air entering an internal combustion engine may comprise diverting at least some of the intake air away from the engine in response to detection of a first operating condition that is indicative of a minimum engine fueling rate, monitoring a second operating condition that is indicative of a flow rate of the intake air entering the engine, and discontinuing diverting at least some of the intake air away from the engine if the second operating condition indicates that the flow rate of the intake air entering the engine is within a threshold value of a target flow rate.

A flow diverter valve may have an inlet in fluid communication with one of an intake manifold of the engine and an air intake conduit that is fluidly coupled between the intake manifold and a compressor of a turbocharger, and an outlet that is not in fluid communication with the air intake conduit or the intake manifold. Diverting at least some of the intake air away from the engine may then comprise controlling the flow diverter valve to at least partially open an air flow path between the inlet and the outlet. The flow diverter valve may be disposed in-line with the air intake conduit. Discontinuing diverting at least some of the intake air away from the engine may then comprise controlling the flow diverter valve to close the air flow path between the inlet and the outlet so that air does not flow through the outlet of the flow diverter valve. Alternatively or additionally, an air diverting conduit may have one end fluidly coupled to one of the air intake conduit and the intake manifold, wherein the flow diverter valve is disposed in-line with the air diverting conduit. Discontinuing diverting at least some of the intake air away from the engine may then comprise controlling the flow diverter valve to close the air path between the inlet and the outlet so that air does not flow from the one of the intake conduit and the intake manifold through the air diverting conduit. In any case, monitoring a second operating condition that is indicative of a flow rate of the intake air entering the engine may comprise monitoring a pressure differential across the compressor of the turbocharger. Discontinuing diverting at least some of the intake air away from the engine if the second operating condition indicates that the flow rate of the intake air entering the engine is within a threshold value of a target flow rate may then comprise controlling the flow diverter valve to close the air flow path between the inlet and outlet thereof when the pressure differential across the compressor is within a threshold value.

In one illustrative embodiment, the first operating condition may correspond to disengagement of a clutch positioned between the engine and a transmission having a number of manually selectable gear ratios. An engine speed sensor may be configured to produce an engine speed signal corresponding to a rotational speed of the engine, an intake manifold temperature sensor may be configured to produce a temperature signal corresponding to a temperature of the intake air entering the engine and an intake manifold pressure sensor may be configured to produce a pressure signal corresponding to air pressure within an intake manifold of the engine. Monitoring the second operating condition may comprise continually computing an estimated flow rate of the intake air entering the engine as a function of the engine speed signal, the temperature signal and the pressure signal. The second operating condition may then indicate that the flow rate of the intake air entering the engine is within the threshold value of a target flow rate if the estimated flow rate of the intake air entering the engine is within the threshold value of the target flow rate. An exhaust gas recirculation (EGR) system may comprise an EGR conduit fluidly coupled between an exhaust manifold of the engine and the intake manifold, a flow restriction may have an inlet and an outlet positioned in-line with the EGR conduit and a differential pressure sensor may be configured to produce a differential pressure signal corresponding a differential pressure between the inlet and the outlet of the flow restriction. Computing an estimated flow rate of the intake air entering the engine may then comprise computing the estimated flow rate of the intake air entering the engine further as a function of the differential pressure signal.

Alternatively, a mass flow rate sensor may be configured to produce a mass flow rate signal corresponding to the flow rate of the intake air entering the engine. Monitoring the second operating condition may then comprise monitoring the mass flow rate signal. The second operating condition may indicate that the flow rate of the intake air entering the engine is within the threshold value of the target flow rate if the monitored mass flow rate signal indicates that the flow rate of the intake air entering the engine is within the threshold value of the target flow rate.

Alternatively still, a turbocharger speed sensor may be configured to produce a turbocharger speed signal corresponding to a rotational speed of a turbocharger operatively coupled to the engine. Monitoring the second operating condition may then comprise monitoring the turbocharger speed signal. The second operating condition may indicate that the flow rate of the intake air entering the engine is within the threshold value of the target flow rate if the monitored turbocharger speed signal indicates that the turbocharger rotational speed is within a threshold speed value of a target turbocharger speed.

In another illustrative embodiment, a fuel system may be operatively coupled to the engine. In this embodiment, the first operating condition may correspond to a requested fuel value being at or near the minimum engine fueling rate. The requested fuel value may correspond to a flow rate fuel requested to be delivered by the fuel system to the engine. An engine speed sensor may be configured to produce an engine speed signal corresponding to a rotational speed of the engine, an intake manifold temperature sensor may be configured to produce a temperature signal corresponding to a temperature of the intake air entering the engine and an intake manifold pressure sensor may be configured to produce a pressure signal corresponding to air pressure within an intake manifold of the engine. Monitoring the second operating condition may comprise continually computing an estimated flow rate of the intake air entering the engine as a function of the engine speed signal, the temperature signal and the pressure signal. The second operating condition may then indicate that the flow rate of the intake air entering the engine is within the threshold value of a target flow rate if the estimated flow rate of the intake air entering the engine is within the threshold value of the target flow rate. An exhaust gas recirculation (EGR) system may comprise an EGR conduit fluidly coupled between an exhaust manifold of the engine and the intake manifold, a flow restriction may have an inlet and an outlet positioned in-line with the EGR conduit and a differential pressure sensor may be configured to produce a differential pressure signal corresponding a differential pressure between the inlet and the outlet of the flow restriction. Computing an estimated flow rate of the intake air entering the engine may then comprise computing the estimated flow rate of the intake air entering the engine further as a function of the differential pressure signal.

Alternatively, a mass flow rate sensor may be configured to produce a mass flow rate signal corresponding to the flow rate of the intake air entering the engine. Monitoring the second operating condition may then comprise monitoring the mass flow rate signal. The second operating condition may indicate that the flow rate of the intake air entering the engine is within the threshold value of the target flow rate if the monitored mass flow rate signal indicates that the flow rate of the intake air entering the engine is within the threshold value of the target flow rate.

Alternatively still, a turbocharger speed sensor may be configured to produce a turbocharger speed signal corresponding to a rotational speed of a turbocharger operatively coupled to the engine. Monitoring the second operating condition may then comprise monitoring the turbocharger speed signal. The second operating condition may indicate that the flow rate of the intake air entering the engine is within the threshold value of the target flow rate if the monitored turbocharger speed signal indicates that the turbocharger rotational speed is within a threshold speed value of a target turbocharger speed.

In yet another illustrative embodiment, an accelerator pedal may be manually actuatable between a reference position, corresponding to the minimum engine fueling rate, and a fully depressed position, corresponding to a maximum engine fueling rate. The first operating condition may then correspond to the reference position of the accelerator pedal. An engine speed sensor may be configured to produce an engine speed signal corresponding to a rotational speed of the engine, an intake manifold temperature sensor may be configured to produce a temperature signal corresponding to a temperature of the intake air entering the engine and an intake manifold pressure sensor may be configured to produce a pressure signal corresponding to air pressure within an intake manifold of the engine. Monitoring the second operating condition may comprise continually computing an estimated flow rate of the intake air entering the engine as a function of the engine speed signal, the temperature signal and the pressure signal. The second operating condition may then indicate that the flow rate of the intake air entering the engine is within the threshold value of a target flow rate if the estimated flow rate of the intake air entering the engine is within the threshold value of the target flow rate. An exhaust gas recirculation (EGR) system may comprise an EGR conduit fluidly coupled between an exhaust manifold of the engine and the intake manifold, a flow restriction may have an inlet and an outlet positioned in-line with the EGR conduit and a differential pressure sensor may be configured to produce a differential pressure signal corresponding a differential pressure between the inlet and the outlet of the flow restriction. Computing an estimated flow rate of the intake air entering the engine may then comprise computing the estimated flow rate of the intake air entering the engine further as a function of the differential pressure signal.

Alternatively, a mass flow rate sensor may be configured to produce a mass flow rate signal corresponding to the flow rate of the intake air entering the engine. Monitoring the second operating condition may then comprise monitoring the mass flow rate signal. The second operating condition may indicate that the flow rate of the intake air entering the engine is within the threshold value of the target flow rate if the monitored mass flow rate signal indicates that the flow rate of the intake air entering the engine is within the threshold value of the target flow rate.

Alternatively still, a turbocharger speed sensor may be configured to produce a turbocharger speed signal corresponding to a rotational speed of a turbocharger operatively coupled to the engine. Monitoring the second operating condition may then comprise monitoring the turbocharger speed signal. The second operating condition may indicate that the flow rate of the intake air entering the engine is within the threshold value of the target flow rate if the monitored turbocharger speed signal indicates that the turbocharger rotational speed is within a threshold speed value of a target turbocharger speed.

In still another illustrative embodiment, an engine compression brake may be operatively coupled to the engine. The first operating condition may then correspond to activation of the engine compression brake. An engine speed sensor may be configured to produce an engine speed signal corresponding to a rotational speed of the engine, an intake manifold temperature sensor may be configured to produce a temperature signal corresponding to a temperature of the intake air entering the engine and an intake manifold pressure sensor may be configured to produce a pressure signal corresponding to air pressure within an intake manifold of the engine. Monitoring the second operating condition may comprise continually computing an estimated flow rate of the intake air entering the engine as a function of the engine speed signal, the temperature signal and the pressure signal. The second operating condition may then indicate that the flow rate of the intake air entering the engine is within the threshold value of a target flow rate if the estimated flow rate of the intake air entering the engine is within the threshold value of the target flow rate. An exhaust gas recirculation (EGR) system may comprise an EGR conduit fluidly coupled between an exhaust manifold of the engine and the intake manifold, a flow restriction may have an inlet and an outlet positioned in-line with the EGR conduit and a differential pressure sensor may be configured to produce a differential pressure signal corresponding a differential pressure between the inlet and the outlet of the flow restriction. Computing an estimated flow rate of the intake air entering the engine may then comprise computing the estimated flow rate of the intake air entering the engine further as a function of the differential pressure signal.

Alternatively, a mass flow rate sensor may be configured to produce a mass flow rate signal corresponding to the flow rate of the intake air entering the engine. Monitoring the second operating condition may then comprise monitoring the mass flow rate signal. The second operating condition may indicate that the flow rate of the intake air entering the engine is within the threshold value of the target flow rate if the monitored mass flow rate signal indicates that the flow rate of the intake air entering the engine is within the threshold value of the target flow rate.

Alternatively still, a turbocharger speed sensor may be configured to produce a turbocharger speed signal corresponding to a rotational speed of a turbocharger operatively coupled to the engine. Monitoring the second operating condition may then comprise monitoring the turbocharger speed signal. The second operating condition may indicate that the flow rate of the intake air entering the engine is within the threshold value of the target flow rate if the monitored turbocharger speed signal indicates that the turbocharger rotational speed is within a threshold speed value of a target turbocharger speed.

A fuel system may be operatively coupled to the engine. The first operating condition may correspond to a requested fuel value being at or near a predefined engine fueling rate and a rate of change of the requested fueling rate being above a predefined fueling rate value. The requested fuel value may correspond to a flow rate fuel requested to be delivered by the fuel system to the engine. An engine speed sensor may be configured to produce an engine speed signal corresponding to a rotational speed of the engine. An intake manifold temperature sensor may be configured to produce a temperature signal corresponding to a temperature of the intake air entering the engine. An intake manifold pressure sensor may be configured to produce a pressure signal corresponding to air pressure within an intake manifold of the engine. Monitoring the second operating condition may comprise continually computing an estimated flow rate of the intake air entering the engine as a function of the engine speed signal, the temperature signal and the pressure signal. The second operating condition may indicate that the flow rate of the intake air entering the engine is within the threshold value of a target flow rate if the estimated flow rate of the intake air entering the engine is within the threshold value of the target flow rate. An exhaust gas recirculation (EGR) system may comprise an EGR conduit fluidly coupled between an exhaust manifold of the engine and the intake manifold, a flow restriction having an inlet and an outlet positioned in-line with the EGR conduit and a differential pressure sensor configured to produce a differential pressure signal corresponding a differential pressure between the inlet and the outlet of the flow restriction. Computing an estimated flow rate of the intake air entering the engine may comprise computing the estimated flow rate of the intake air entering the engine further as a function of the differential pressure signal.

A system for controlling a flow of intake air entering an internal combustion engine may comprise an air intake conduit having one end fluidly coupled to an intake manifold of the engine and an opposite end fluidly coupled to a compressor of a turbocharger, a flow diverter valve having an inlet in fluid communication with one of the air intake conduit and the intake manifold, and an outlet that is not in fluid communication with the air intake conduit or the intake manifold, a valve actuator responsive to a close signal to close the flow diverter valve and to an open signal to at least partially open the flow diverter valve, and a control circuit. The control circuit may include a memory having instructions stored therein that are executable by the control circuit to divert at least some of the intake air away from the engine by producing the open signal upon detection of a first operating condition that is indicative of a minimum engine fueling rate, monitoring a second operating condition that is indicative of a flow rate of the intake air entering the engine, and discontinuing diverting at least some of the intake air away from the engine by producing the close signal if the second operating condition indicates that the flow rate of the intake air entering the engine is within a threshold value of a target flow rate.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
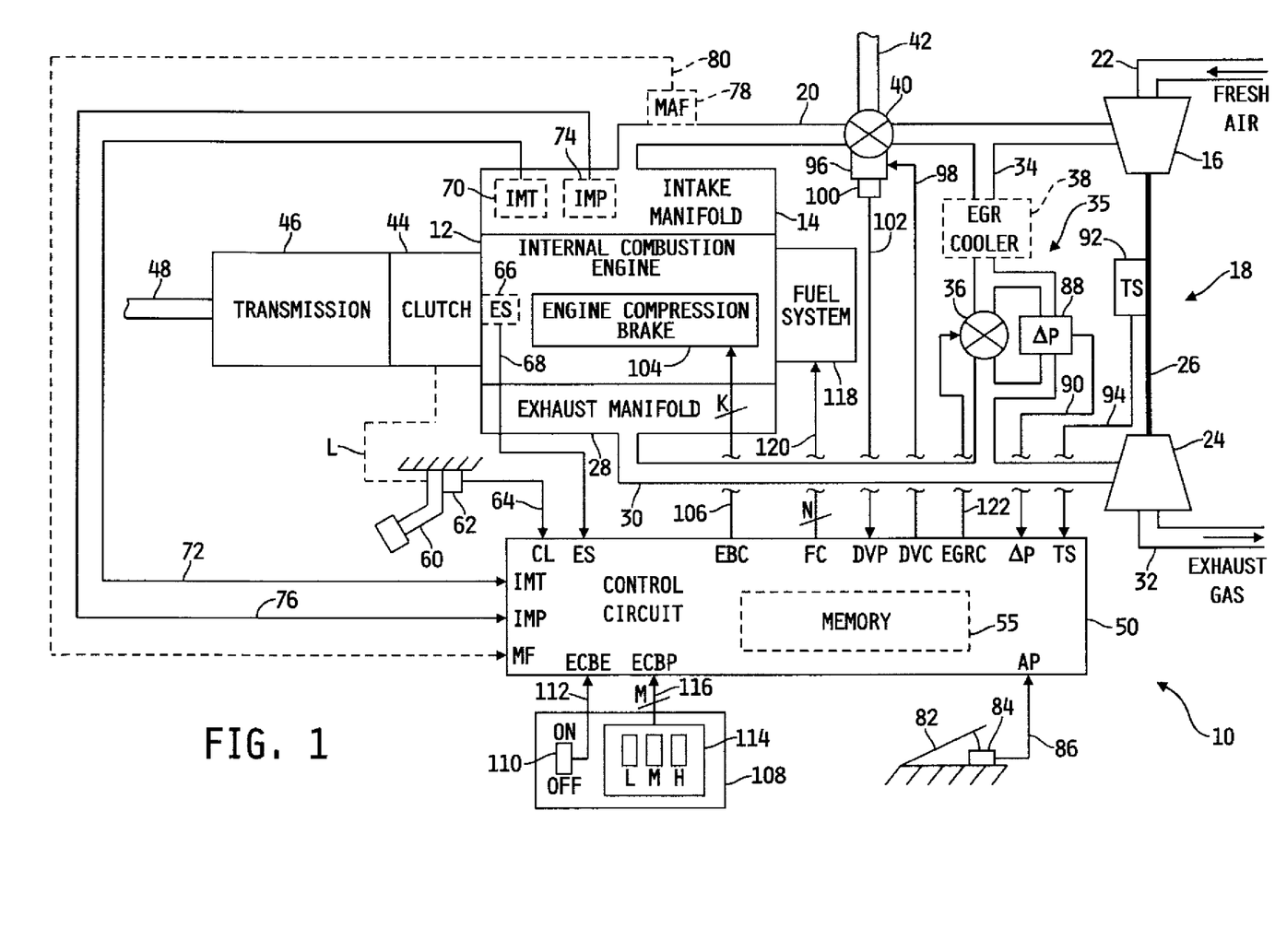
FIG. 1 is a diagrammatic illustration of one illustrative embodiment of a system for controlling a flow of intake air entering an internal combustion engine.

Referring now to FIG. 1, a diagrammatic illustration is shown of one illustrative embodiment of a system 10 for controlling a flow of intake air entering an internal combustion engine 12. In the illustrated embodiment, the engine 12 has an intake manifold 14 fluidly coupled to an outlet of a compressor 16 of a conventional turbocharger 18 via an intake conduit 20. The compressor 16 includes a compressor inlet coupled to an intake conduit 22 for receiving fresh air. The turbocharger compressor 16 is mechanically coupled to a turbocharger turbine 24 via a rotating drive shaft 26, and the turbine 24 includes a turbine inlet fluidly coupled to an exhaust manifold 28 of the engine 12 via an exhaust conduit 30. The turbine 24 includes a turbine outlet fluidly coupled to ambient via an exhaust conduit 32.

In the embodiment illustrated in FIG. 1, the system 10 further includes an exhaust gas recirculation (EGR) system 35 including an EGR valve 36 or other flow restriction disposed in-line with an EGR conduit 34 that is fluidly coupled at one end to the intake conduit 20 and an opposite end to the exhaust conduit 30. An EGR cooler 38 of known construction may optionally be disposed in-line with the EGR conduit 34 between the EGR valve 36 and the intake conduit 20 as shown in phantom in FIG. 1, or between the exhaust conduit 30 and the EGR valve 36. In the latter embodiment, the EGR valve 36 may illustratively be positioned such that the exhaust gas outlet thereof is at or near the junction of the EGR conduit 34 and the intake conduit 20, although alternative positioning of the EGR valve 36 in this embodiment is contemplated. In any case, it will be understood that the EGR system 35 is not required for operation of the system 10 as described herein, and that this disclosure accordingly contemplates embodiments of the system 10 that do not include the EGR system 35.

The system 10 further includes a flow diverter valve 40 that is illustratively disposed in-line with the intake conduit 20. The flow diverter valve 40 has an inlet in fluid communication with the air intake conduit 20 and at least one outlet that is not in fluid communication the air intake conduit 20. In the illustrated embodiment, the valve 40 has two outlets; one that is in fluid communication with the air intake conduit 20 and another that is in fluid communication with one end of an air diverting conduit 42. An opposite end of the air diverting conduit 42 may, in some embodiments, be vented to ambient, and in other embodiments may be fluidly coupled to another conduit and/or device. In one alternative embodiment, the flow diverter valve 40 may be disposed in-line with the air diverting conduit 42 such that one end of the air diverting conduit 42 forms a junction with the air intake conduit. In this embodiment, the flow diverter valve 40 has a single inlet and a single outlet. In another alternative embodiment, the flow diverter valve 40 may be positioned in fluid communication with the intake manifold 14 such that an inlet of the valve 40 is in fluid communication with the intake manifold 14 and an outlet of the valve 40 is positioned outside of the intake manifold 14. The outlet of the valve 40 in this embodiment may be suitably vented to ambient, or may alternatively be fluidly coupled to another conduit and/or device. In any case, the flow diverter valve 40 may be controlled, as will be described in detail hereinafter, to divert at least some of the intake air flowing through the air intake conduit 20 and/or the intake manifold 14 away from the intake manifold 14 and therefore away from the engine 12.

In the embodiment illustrated in FIG. 1, the system 10 further includes a conventional clutch 44 operatively coupled at one end to the engine 12 and at an opposite end to one end of a conventional transmission 46 that has a number of manually selectable gear ratios. A tail shaft or propeller shaft 48 is rotatably coupled to the transmission 46 and extends rearwardly from an opposite end of the transmission. The number of manually selectable gear ratios of the transmission 46 may be engaged and disengaged in a conventional manner via a manually actuatable gear shift lever (not shown) under manual control of an operator of the vehicle carrying the engine 12, clutch 44 and transmission 46.

The system 10 further includes a control circuit 50 that is generally operable to control and manage the overall operation of the engine 12. The control circuit 50 includes a memory unit 55 as well as a number of inputs and outputs for interfacing with various sensors and systems coupled to the engine 12. The control circuit 50, is illustratively microprocessor-based, although this disclosure contemplates other embodiments in which the control circuit 50 may alternatively be or include a general purpose or application specific control circuit capable of operation as will be described hereinafter. In any case, the control circuit 50 may be a known control unit sometimes referred to as an electronic or engine control module (ECM), electronic or engine control unit (ECU) or the like. Illustratively, the memory 55 of the control circuit 50 has stored therein one or more sets of instructions that are executable by the control circuit 50, as will be described in greater detail hereinafter, to control the flow of intake air entering the engine 12.

The control circuit 50 includes a number of inputs for receiving signals from various sensors or sensing systems associated with system 10. The control circuit 50 is generally operable in a conventional manner to sample the signals produced by the various sensors or sensing systems and to processes the sampled signals to determine the associated engine operating condition. For example, the system 10 includes a conventional clutch pedal 60 that is mechanically coupled to the clutch 44 via a mechanical linkage, L, and that includes a clutch pedal position sensor 62 that is electrically connected to a clutch pedal position input, CL, of the control circuit 50 via a signal path 64. The clutch pedal position sensor 62 is configured to produce a clutch position signal on the signal path 64 that is indicative of the position of the clutch pedal 60 relative to a reference position. Illustratively, the clutch pedal 60 is normally in a clutch engaged position, and the reference position of the clutch pedal 60 is in this case the clutch engaged position. In the clutch engaged position, as is known in the art, the clutch 44 mechanically engages the engine 12 with the transmission 46. The clutch pedal 60 is manually actuatable by an operator of the vehicle to a clutch disengaged position. In the clutch disengaged position, as is known in the art, the clutch 44 mechanically disengages the engine 12 from the transmission 46 so that, for example, a transmission shift can occur whereby a different one of the number of manually selectable gear ratios of the transmission 46 may be manually selected. In the illustrated embodiment, the clutch pedal position sensor may be, for example, a switch that produces either a clutch engaged signal or a clutch disengaged signal depending upon the operational state of the clutch 44. Alternatively, the clutch pedal position sensor 62 may be implemented as a conventional analog position sensor, and the control circuit 50 may be programmed in a conventional manner to process the analog signal produced by such a sensor to determine clutch engaged and clutch disengaged operating conditions.

The system 10 further includes an engine speed sensor 66 that is electrically connected to an engine speed input, ES, of the control circuit 50 via a signal path 68. The engine speed sensor 66 is conventional and is operable to produce a signal from which the rotational speed of the engine, ES, can be conventionally determined by the control circuit 50. In one embodiment, the sensor 66 is a Hall effect sensor operable to sense engine speed and position by sensing passage thereby of a number of spaced-apart teeth formed on a gear or tone wheel that rotates synchronously with the engine crankshaft (not shown), and to produce a signal from which engine speed and engine position may be determined by the control circuit 50. Alternatively, the engine speed sensor 50 may be any other known sensor operable to produce a signal from which engine speed may be determined including, but not limited to, a variable reluctance sensor or the like.

The system 10 further includes an intake manifold temperature sensor 70 disposed in fluid communication with the intake manifold 14 of the engine 12, and electrically connected to an intake manifold temperature input, IMT, of the control circuit 50 via a signal path 72. The intake manifold temperature sensor 70 may be of known construction, and is operable to produce a temperature signal on the signal path 72 that corresponds to the temperature of intake air entering the engine 12 via the intake manifold 14. The term "intake air," for purposes of this disclosure is generally defined as the gas flowing into the engine 12 via the intake manifold 14 via the conduit 20. In embodiments of the system 10 that include the EGR system 35, the "intake air" will generally made up of a combination of fresh air supplied to the intake conduit 20, e.g., via the turbocharger compressor 16, and recirculated exhaust gas supplied by the EGR conduit 34. In embodiments of the system 10 that do not include the EGR system 35, the "intake air" will generally be only the fresh air supplied to the intake conduit 20. Although the intake manifold temperature sensor 70 is illustrated in FIG. 1 as being positioned in fluid communication with the intake manifold 14, the sensor 70 may alternatively be positioned in fluid communication with the intake conduit 20 downstream of the junction of the EGR conduit 34 with the intake conduit 20 in embodiments of the system 10 that include the EGR system 35, and otherwise anywhere along the intake conduit 20 downstream of the flow diverter valve 40.

The system 10 further includes an intake manifold pressure sensor 74 that is disposed in fluid communication with the intake manifold 14 and electrically connected to an intake manifold pressure input, IMP, of the control circuit 50 via a signal path 76. The intake manifold pressure sensor 74 may be of known construction, and is operable to produce a pressure signal on the signal path 76 that corresponds to the pressure of the air within the intake manifold 14. Although the intake manifold pressure sensor 74 is illustrated in FIG. 1 as being positioned in fluid communication with the intake manifold 14, the sensor 74 may alternatively be positioned in fluid communication with the intake conduit 20 downstream of the flow diverter valve 40.

Illustratively, as will be described in greater detail hereinafter, the control circuit 42 may be operable to estimate the flow rate of the intake air entering the intake manifold 14, i.e., the intake air flow rate, as a function of a number of other engine operating parameters. Alternatively or additionally, as shown in phantom in FIG. 1, the system 10 may include a mass flow sensor 78 that is disposed in fluid communication with the intake conduit 20 (or alternatively in fluid communication with the intake manifold 14) and electrically connected to a mass flow input, MF, of the control circuit 50 via a signal path 80. In this embodiment, the mass flow sensor 78 may be of known construction and be operable to produce a mass flow signal on the signal path 78 that corresponds to the mass flow rate of the intake air entering the engine 12 via the intake manifold 14. In embodiments in which the sensor 78 is included in the system 10, the mass flow signal produced by the sensor 78 may be used to determine the mass flow rate of the intake air entering the intake manifold 14, i.e., the intake air flow rate, in lieu of an intake air flow rate estimation algorithm, or to supplement, compare with and/or diagnose, an estimated intake air flow rate value produced by an intake air flow rate estimation algorithm. In the former case, an intake air flow rate estimation algorithm may additionally be used to provide an estimated intake air flow rate value that may be used to supplement, compare with and/or diagnose the mass flow rate signal produced by the sensor 78.

The system 10 further includes an accelerator pedal 82 mechanically coupled to an accelerator pedal position sensor 84 that is electrically connected to an accelerator pedal position input, AP, of the control circuit 50 via a signal path 86. The accelerator pedal 82 is manually actuatable between a reference position and a fully depressed position, and the accelerator pedal position sensor 84 is configured to produce an accelerator position signal on the signal path 86 that is indicative of the position of the accelerator pedal 84 relative to the reference position. Illustratively, the accelerator pedal 82 is normally biased to its reference position which corresponds to an un-actuated or un-depressed position, and the reference position of the accelerator pedal 82 results in a minimum engine fueling rate, e.g., that which results in an engine idle condition. The fully depressed position of the accelerator pedal 82 conversely results in a maximum engine fueling rate. Illustratively, the accelerator pedal position sensor 84 is implemented as a conventional analog position sensor, and the control circuit 50 is programmed in a conventional manner to process the analog signal produced by the accelerator pedal position sensor 82 to determine a position of the accelerator pedal 82 relative to the reference accelerator pedal position.

In embodiments that include the EGR system 35, the system 10 further includes a differential pressure sensor, or ΔP sensor, 88 that is fluidly coupled at one end to the EGR conduit 34 adjacent to an exhaust gas inlet of the flow restriction 36, e.g., EGR valve, and that is fluidly coupled at its opposite end to the EGR conduit 34 adjacent to an exhaust gas outlet of the flow restriction 36. Alternatively, the ΔP sensor 88 may be fluidly coupled across another flow restriction structure disposed in-line with the EGR conduit 34. In any case, the ΔP sensor 82 may be of known construction and is electrically connected to a differential pressure input, ΔP, of the control circuit 50 via signal a path 90. The ΔP sensor 88 is operable to produce a differential pressure signal on the signal path 90 that corresponds to the pressure differential across the flow restriction 36, e.g., the EGR valve, or other flow restriction structure disposed in-line with the EGR conduit 34.

The system 10 further includes a turbocharger speed sensor 92 that is electrically connected to a turbocharger speed input, TS, of the control circuit 50 via a signal path 94. The turbocharger speed sensor 92 is conventional and is operable to produce a signal from which the rotational speed of the turbocharger, TS, can be conventionally determined by the control circuit 50. In one embodiment, the sensor 66 is a variable reluctance sensor operable to sense the rotational speed of the turbocharger 18 in a conventional manner, and to produce a signal from which turbocharger speed may be determined by the control circuit 50.

The system 10 further includes a number of actuators for controlling one or operational aspects of the engine 12. For example, the system 10 includes a flow diverter valve actuator 96 and a flow diverter valve position sensor 100 that is operatively coupled to the flow diverter valve actuator 96. The flow diverter valve actuator is operatively coupled to the flow diverter valve 40, and is electrically coupled to a flow diverter valve control output, DVC, of the control circuit 50 via a signal path 98. The flow diverter valve position sensor 100 is electrically connected to a flow diverter valve position input, DVP, of the control circuit 50 via a signal path 102. The flow diverter valve actuator 96 is responsive to flow diverter valve control signals produced by the control circuit 50 at the DVC output to control the position of the flow diverter valve 40 relative to a reference position. For example, the flow diverter valve actuator 96 is responsive to a close signal produce by the control circuit 50 at the DVC output to close the flow diverter valve 40, and is responsive to an open signal to at least partially open the flow diverter valve 40. The flow diverter valve position sensor 100 is a conventional sensor that is operable to produce a position signal on the signal path 102 that corresponds to the position of the flow diverter valve 40 relative to the reference position. The control circuit 50 is operable, using known feedback control techniques, to control the flow diverter valve 40 to a desired flow diverter valve position by producing a corresponding flow diverter valve control signal, DVC, on the signal path 98 based on the flow diverter valve position signal, DVP, produced by the flow diverter valve position sensor 100 on the signal path 102. By controlling the position of the flow diverter valve 40, the control circuit 50 is operable to control selective diverting of at least some of the intake air that would have entered the engine 12 away from the intake manifold 14 and therefore away from the engine 12.

The system 10 further includes a conventional engine compression brake 104 that is operatively coupled to the engine 12, and that is electrically coupled to the control circuit 50 via a number, K, of signal paths 106, wherein K may be any positive integer. The engine compression brake 104 is responsive to control signals produced by the control circuit 50 on the one or more signals paths 106 to produce or apply a corresponding retarding force that decreases the rotational speed of the engine 12. Illustratively, the engine compression brake 104 is operable, under the control of the control circuit 50, to selectively control the opening and closing times of one or more cylinder exhaust valves (not shown) via control of one or more corresponding cylinder valve actuators (not shown) to resultantly apply a braking or retarding force to the engine 12. An engine compression brake operation selector 108 is located in the cab area of the vehicle and includes a plurality of switches used to enable operation of the engine compression brake 104 and to control operation of the engine compression brake 104. For example, the engine compression brake operation selector 108 includes an ON/OFF switch 110 that is electrically connected to an engine compression brake enable input, ECBE, of the control circuit 50 via a signal path 112. When the switch 110 is in the ON position, the engine compression brake 104 is enabled for operation, and when the switch 110 is in the OFF position, operation of the engine compression brake 104 is disabled. Additional switches 114 are provided to allow for control of a relative amount of retarding force applied by the engine compression brake 104 when activated, and these switches are electrically connected to an engine compression brake position input, ECBP, of the control circuit 50 via a number, M, of signal paths 116, wherein M may be any positive integer. In the illustrated embodiment, three such switches, L, M and H, are provided to allow user control of the engine compression brake 104 between corresponding low, medium and high engine retarding force settings. Alternatively, a single, three-position switch may be implemented in place of the three switches, L, M and H. In the illustrated embodiment, the engine compression brake 104 is enabled for operation when the ON/OFF switch 110 is in the ON position, and the engine compression brake 104 is activated if enabled and the engine fueling rate then drops to a minimum fueling rate, e.g., to an engine idle condition. This operational scenario occurs when, for example, the operator causes the accelerator pedal 82 to return to its reference position from a position other than the reference position, such as when braking, shifting to a different gear ratio of the transmission, or the like.

The system 10 further includes a fuel system 118 that is electrically connected to a fuel command output, FC, of the control circuit 50 via a number, N, of signal paths 120, wherein N may be any positive integer. The fuel system 118 is generally responsive to the fueling commands produced by control circuit 50 on the signal paths 120 to supply fuel, via one or more fuel injectors (not shown), to the engine 12, and the control circuit 50 is configured to produce such fueling commands in a manner well-known in the art.

The fueling commands produced by the control circuit 50 are produced under the control of at least one fuel control algorithm stored in the memory unit 55 and executed by the control circuit 50. The at least one fuel control algorithm is configured to compute the fueling commands as a function of a number of engine operating conditions as is known in the art. One such engine operating condition is a requested fueling value, RQF. The requested fueling value, RQF, is a conventional fueling value that represents user-requested fueling, e.g., via user actuation of the accelerator pedal 82 and/or user-setting of a conventional cruise control unit (not shown), which may be further limited or modified by one or more conventional algorithms resident within the memory 55 and executed by the control circuit 50. For purposes of this document, the requested fuel value, RQF, generally corresponds to a request for delivery of fuel by the fuel system 118 to the engine 12. The requested fuel value, RQF, may range between a minimum engine fueling rate, e.g., that which results in an engine idle condition, and a maximum engine fueling rate, e.g., a maximum allowable fueling rate.

In embodiments that include the EGR system 35, the system 10 further includes an EGR valve actuator and an EGR valve position sensor, which are represented in FIG. 1 by the bi-directional signal path 122 that is electrically coupled between the EGR valve 36 and an EGR control port, EGRC, of the control circuit 50. Operation of the EGR valve actuator and position sensor is similar to that described above with reference to the flow diverter valve 40 in that the EGR valve actuator is responsive to EGR valve control signals produced by the control circuit 50 to control the position of the EGR valve 36 relative to a reference position, and the EGR valve position sensor is operable to produce a position signal that corresponds to the position of the EGR valve 36 relative to the reference position. The control circuit 50 is operable, using known feedback control techniques, to control the EGR valve 36 to a desired EGR valve position by producing an EGR valve control signal based on the EGR valve position signal. By controlling the position of the EGR valve 36, the control circuit 50 is operable to control the flow of recirculated exhaust gas from the exhaust manifold 28 to the intake manifold 14.

Figure 2:
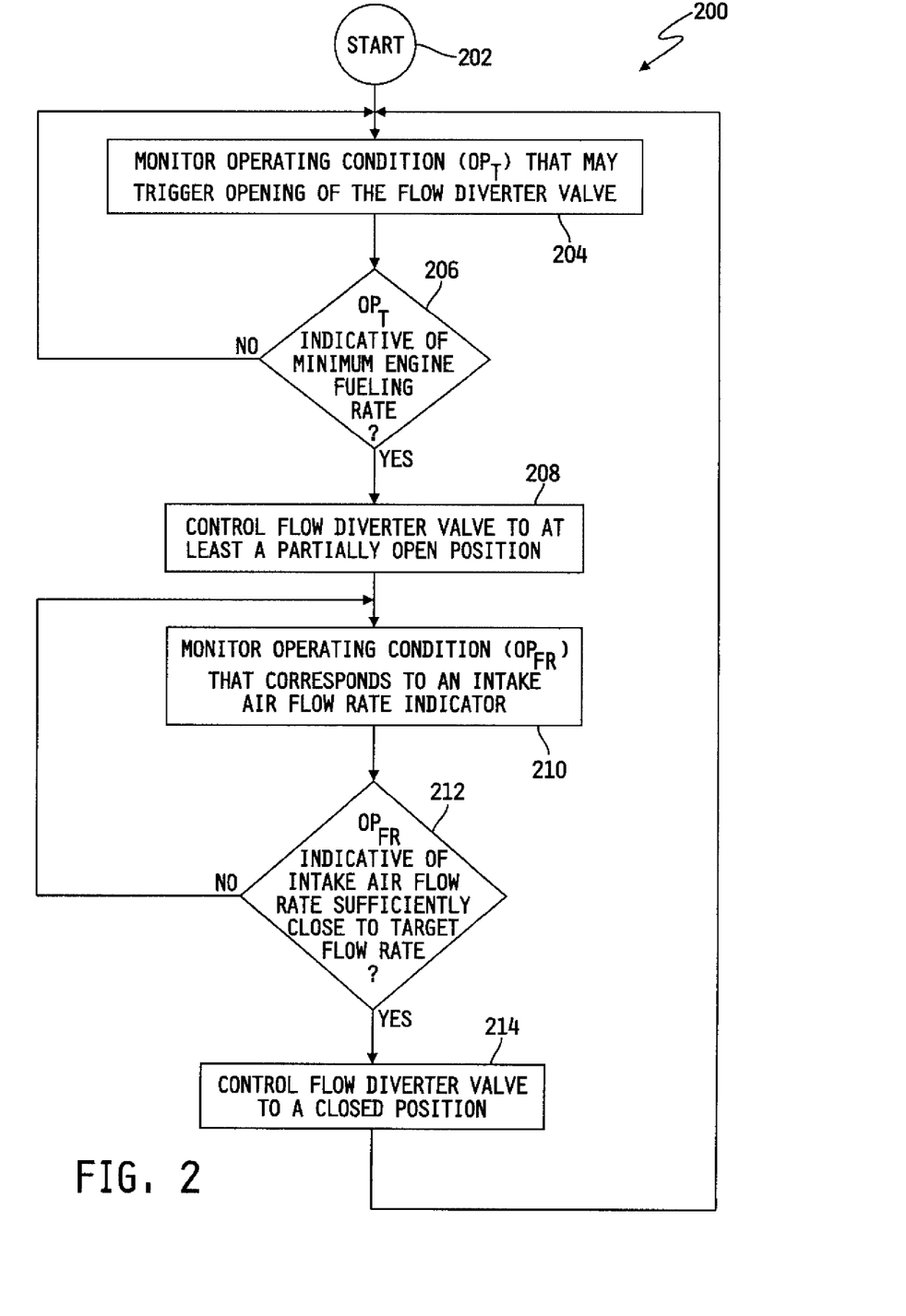
FIG. 2 is a flowchart of one illustrative embodiment of a process for controlling a flow of intake air entering an internal combustion engine.

Referring now to FIG. 2, a flowchart is shown of one illustrative embodiment of a process 200 for controlling the flow of intake air entering the engine 12. The process 200 is illustratively provided in the form of instructions that are stored in the memory unit 55 and that are executable by the control circuit 50 to control the flow of intake air entering the engine 12 by selectively controlling operation of the flow diverter valve 40.

The process 200 begins at step 202, and thereafter at step 204 the control circuit 50 is operable to monitor an operating condition, $OP_T$, that may trigger opening of the flow diverter valve 40. Thereafter at step 206, the control circuit 50 is operable to determine whether $OP_T$ is indicative of a minimum engine fueling rate. Illustratively, the minimum engine fueling rate is a fueling rate that results in an engine idling condition, although the minimum engine fueling rate may alternatively correspond to an engine fueling rate that is near, e.g., within a threshold value of, the minimum engine fueling rate. In any case, if the control circuit 50 determines at step 206 that the operating condition, $OP_T$, is not indicative of the minimum engine fueling rate, the process 200 loops back to step 204. If instead the control circuit 50 determines at step 206 that the operating condition, $OP_T$, is indicative of the minimum engine fueling rate, the process 200 advances to step 208 where the control circuit 50 is operable to control the diverter valve 40 to at least a partially open position to thereby at least partially open an air flow path between an inlet and an outlet of the flow diverter valve 40.

The control circuit 50 is operable at steps 204-208 to monitor an operating condition, $OP_T$, and to control the flow diverter valve 40 to divert at least some of the intake air away from the engine in response to detecting that the operating condition, $OP_T$, is indicative of the minimum fueling condition. Generally, the operating condition, $OP_T$, may be any operating parameter that is a direct or an indirect indicator of the engine fueling rate being at, or dropping to, the minimum fueling rate. In one illustrative embodiment, for example, the operating condition, $OP_T$, is the requested fueling value, RQF, and the operating condition, $OP_T$, is indicative of minimum engine fueling when the requested fueling value is at or near the minimum engine fueling rate. Alternatively, the operating condition, $OP_T$, is indicative of minimum engine fueling when the requested fueling value, RQF, is at, or near, a threshold fueling rate that may or may not be the minimum engine fueling rate, and when the rate of change of the requested fueling rate, i.e., the rate of decrease of RQF, is greater than a specified rate of change value. In either embodiment, the operating condition that is indicative of minimum engine fueling is thus a direct indicator of minimum engine fueling rate and corresponds to the requested fueling value, RQF, being at the minimum engine fueling rate.

In another illustrative embodiment, the operating condition, $OP_T$, is the position of the accelerator pedal 82, and the operating condition, $OP_T$, is indicative of minimum engine fueling when the position of the accelerator pedal 82 is the reference position of the accelerator pedal 82. In this embodiment, the operating condition that is indicative of minimum engine fueling is thus a direct indicator of minimum engine fueling rate and corresponds to the position of the accelerator pedal 82 being the reference position thereof.

In a further illustrative embodiment, the operating conditions, $OP_T$ and $OP_R$, are both functions of the oxygen content of charge entering the engine 12 via the intake manifold 14, the oxygen content of recirculated exhaust gas moving through the EGR system 35 and/or the oxygen content of the exhaust gas exiting the exhaust manifold 28. In this embodiment, the operating condition, $OP_T$, is indicative of minimum engine fueling when the oxygen content of the charge entering the intake manifold 14, the oxygen content recirculated exhaust gas moving through the EGR system 35 and/or the oxygen content of the exhaust gas exiting the exhaust manifold 28, and or a function of any combination thereof, indicates that the requested fueling, RQF, is at or near the minimum engine fueling rate, and the operating condition, $OP_R$, is indicative of a subsequent increase in engine fueling rate above the minimum engine fueling rate when the oxygen content of the charge entering the intake manifold 14, the oxygen content recirculated exhaust gas moving through the EGR system 35 and/or the oxygen content of the exhaust gas exiting the exhaust manifold 28, and or a function of any combination thereof, indicates that the requested fuel value, RQF, is increasing or has increased above the minimum engine fueling rate. Any of the oxygen content values in this embodiment may be measured via suitably located conventional oxygen sensors and/or estimated using one or more conventional oxygen content estimation techniques. In any case, the operating condition that is indicative of minimum engine fueling and the operating condition that is indicative of the minimum engine fueling rate increasing above the minimum engine fueling rate in this embodiment are both indirect indicators of minimum engine fueling rate and a subsequent increase in engine fueling rate.

In yet another illustrative embodiment, the operating condition, $OP_T$, is the position of the clutch 44, and the operating condition, $OP_T$, is indicative of minimum engine fueling when disengagement of the clutch 44 occurs. Typically, disengagement of the clutch 44 occurs when the operator is attempting a shift to a different gear ratio of the transmission 46, when the operator is attempting to bring the vehicle to a complete stop, and the like, and therefore typically coincides with, or is followed by, a decrease in engine fueling to the minimum engine fueling rate. In this embodiment, the operating condition that is indicative of minimum engine fueling is thus an indirect indicator of minimum engine fueling rate and corresponds to disengagement of the clutch 44.

In still another illustrative embodiment, the operating condition, $OP_T$, is the operational state of the engine compression brake 104, and the operating condition, $OP_T$, is indicative of minimum engine fueling when the engine compression brake 104 is activated. Typically, activation of the engine compression brake 104 occurs when the operator removes the operator's foot from the accelerator pedal 82 while the engine compression brake 104 is enabled for operation. Removal of the operator's foot from the accelerator pedal 82 typically causes engine fueling rapidly decrease to the minimum engine fueling rate. In this embodiment, the operating condition that is indicative of minimum engine fueling is an indirect indicator of minimum engine fueling rate and corresponds to activation of the engine compression brake 104.

In some embodiments, the operating condition, $OP_T$, may be indicative not only of the minimum fueling condition but also of intake air flow exceeding a target air flow value. In such embodiments, the control circuit 50 may thus be operable at steps 204-208 to monitor the operating condition, $OP_T$, and to control the flow diverter valve 40 to divert at least some of the intake air away from the engine in response to detecting that the operating condition, $OP_T$, is indicative of the minimum fueling condition and also of intake air flow exceeding a target air flow. The control circuit 50 may be operable in such embodiments to monitor intake air flow by measuring the mass flow of intake air, e.g., via the mass air flow sensor 78, or by estimating intake air flow as a conventional function of a number of operating conditions. The control circuit 50 may further be operable to determine the target air flow value in a conventional manner in accordance with a corresponding set of instructions stored in the memory 55, or by retrieving the target air flow value from the memory unit 55 as a static value or based on one or more engine operating parameters. In any case, the process 200 may be modified at steps 204 and 206 in this embodiment to advance to step 208 only if and when the operating condition, $OP_T$, is indicative of the minimum fueling condition and also of intake air flow exceeding the target air flow value.

Execution of the process 200 advances from step 208 to step 210 where the control circuit 50 is operable to monitor an operating condition, $OP_{FR}$, which corresponds to an intake air flow rate indicator. Thereafter at step 212, the control circuit 50 is operable to determine whether $OP_{FR}$ is indicative of an intake air flow rate that is sufficiently close to a target flow rate. Illustratively, the target flow rate is a minimum intake air flow rate that results an acceptable air-to-fuel ratio at the minimum engine fueling rate, although the target flow rate may alternatively correspond to other desired intake air flow rates. In any case, if the control circuit 50 determines at step 212 that the operating condition, $OP_{FR}$, is not indicative of an intake air flow rate that is sufficiently close to the target flow rate, the process 200 loops back to step 210. If instead the control circuit 50 determines at step 212 that the operating condition, $OP_{FR}$, is indicative of an intake air flow rate that is sufficiently close to the target flow rate, the process 200 advances to step 214 where the control circuit 50 is operable to control the diverter valve 40 to a closed position to thereby close the air flow path between an inlet and an outlet of the flow diverter valve 40 so that air does not flow through the outlet of the flow diverter valve 40, or in some embodiments so that air does not flow from the air intake conduit 20 or the intake manifold 14 through the air diverting conduit 42. From step 214, the process 200 loops back to step 204.

The control circuit 50 is operable at steps 210-2014 to monitor an operating condition, $OP_{FR}$, that is indicative of a flow rate of the intake air entering the engine, and to control the flow diverter valve 40 to discontinue diverting at least some of the intake air away from the engine if the operating condition, $OP_{FR}$, indicates that the flow rate of the intake air entering the engine is within a threshold value of a target flow rate. Generally, the operating condition, $OP_{FR}$, may be any operating parameter that is a direct or an indirect indicator of the intake air flow rate being sufficiently close to the target flow rate. In one illustrative embodiment, for example, the operating condition, $OP_{FR}$, is an estimated intake air flow rate, and $OP_{FR}$ indicates that the flow rate of the intake air entering the engine is within the threshold value of the target flow rate if the estimated flow rate of the intake air entering the engine is within the threshold value of the target flow rate. In this embodiment, the operating condition that is indicative of the intake air flow rate being sufficiently close to the target flow rate is a direct indicator of the intake air flow rate and corresponds to an estimate of the intake air flow rate.

In this embodiment, the control circuit is illustratively configured to continually compute an estimated flow rate of the intake air entering the engine as a function of a number of engine operating parameters other than intake air flow rate. In embodiments of the system 10 that include the EGR system 35, for example, the control circuit 50 is operable to compute an estimate of intake air flow rate, $IAF_E$, by first estimating the volumetric efficiency ($\eta_V$) of the air intake components of the engine 12, and then computing $IAF_E$ as a function of $\eta_V$ using a conventional speed/density equation. Any known technique for estimating $\eta_V$ may be used, and in one illustrative embodiment $\eta_V$ is computed according to a known Taylor mach number-based volumetric efficiency equation given as:

$$\eta_V = A_1 * \{(Bore/D)^2 * (stroke*ES)^B / sqrt(\gamma*R*IMT) * [(1+EP/IMP)+A_2)]\} + A_3 \quad (1),$$

where, $A_1, A_2, A_3$ and B are all calibratible parameters that are fit to the volumetric efficiency equation based on mapped engine data, Bore is the intake valve bore length, D is the intake valve diameter, stroke is the piston stroke length, wherein Bore, D and stroke are dependent upon engine geometry, $\gamma$ and R are known constants (e.g., $\gamma R$=387.414 J/kg/deg K), ES is engine speed, IMP is the intake manifold pressure, EP is the exhaust pressure, where EP=IMP+$\Delta$P, and IMT is the intake manifold temperature.

With the volumetric efficiency value $\eta_V$ estimated according to equation (1), the intake air flow rate estimate, $IAF_E$, is computed by the control circuit 50 according to the equation:

$$IAF_E = \eta_V * V_{DIS} * ES * IMP / (2*R*IMT) \quad (2),$$

where, $\eta_V$ is the estimated volumetric efficiency, $V_{DIS}$ is engine displacement and is generally dependent upon engine geometry, ES is engine speed, IMP is the intake manifold pressure, R is a known gas constant (e.g., R=53.3 ft-lbf/lbm deg R or R=287 J/Kg deg K), and IMT is the intake manifold temperature.

In embodiments of the system that do not include the EGR system 35, $\Delta$P is zero, and EP=IMP so that equation (1) reduces to:

$$\eta_V = A_1 * \{(Bore/D)^2 * (stroke*ES)^B / sqrt(\gamma*R*IMT)*(2+A_2)\} + A_3 \quad (3).$$

$IAF_E$ is then computed using equation (2) using the value of $\eta_V$ from equation (3). Thus, in embodiments of the system 10 that do not include the EGR system 35, the control circuit 50 is operable to continually compute an estimated flow rate of the intake air entering the engine as a function of the engine speed signal, the intake manifold temperature signal and the intake manifold pressure signal using equations (2) and (3) above. In embodiments of the system 10 that include the EGR system 35, the control circuit 50 is operable to continually compute an estimated flow rate of the intake air entering the engine as a function of the engine speed signal, the intake manifold temperature signal, the intake manifold pressure signal and the pressure differential signal using equations (1) and (2) above.

In another illustrative embodiment the operating condition, $OP_{FR}$, is a measured intake air flow rate, and $OP_{FR}$ indicates that the flow rate of the intake air entering the engine is within the threshold value of the target flow rate if the measured flow rate of the intake air entering the engine is within the threshold value of the target flow rate. In this embodiment, the system 10 includes the mass flow rate sensor 78, and the control circuit 50 is operable to process the signal produced by the mass flow rate sensor 78 on the signal path 80 to determine the measured intake air flow rate. In this embodiment, the operating condition that is indicative of the intake air flow rate being sufficiently close to the target flow rate is a direct indicator of the intake air flow rate and corresponds to a measured value of the intake air flow rate.

In a further illustrative embodiment the operating condition, $OP_{FR}$, is a pressure differential between the inlet and the outlet of the compressor 16, and $OP_{FR}$ indicates that the flow rate of the intake air entering the engine is within the threshold value of the target flow rate if the pressure differential between the inlet and the outlet of the compressor 16 is within, e.g., less than or between, a threshold value or window. The threshold value or window may be, for example, near zero. In this embodiment, the system 10 includes the intake manifold pressure sensor 74 and, for example, a conventional ambient pressure sensor (not shown), and the control circuit 50 is operable to process the pressure signals produced by these sensors to determine the pressure differential value. In an alternative embodiment, a conventional compressor outlet pressure sensor may be positioned in fluid communication with the intake air conduit 20 adjacent to the outlet of the compressor 16 or anywhere along the intake air conduit 20. In any case, the operating condition that is indicative of the intake air flow rate being sufficiently close to the target flow rate is an indirect indicator of the intake air flow rate and corresponds to a measured value of the intake air flow rate.

In yet another illustrative embodiment the operating condition, $OP_{FR}$, is the rotational speed of the turbocharger 18, and $OP_{FR}$ indicates that the flow rate of the intake air entering the engine is within the threshold value of the target flow rate if the rotational speed of the turbocharger is within a threshold speed of a target turbocharger speed. In this embodiment, the system 10 is operable to process the signal produced by the turbocharger speed sensor 92 on the signal path 84 to determine a measured value of the turbocharger rotational speed. Typically, when the engine fueling rate is reduced to the minimum engine fueling rate, e.g., that which results in an engine idling condition, this results in a corresponding rapid reduction in the flow rate of exhaust gas produced by the engine 12. This rapid drop in exhaust gas flow rate results in a corresponding drop in the rotational speed of the turbocharger turbine 24 which, in turn, causes a corresponding drop in the rotational speed of the turbocharger compressor 16. This then causes a reduction in the flow rate of fresh air supplied by the compressor 16 to the intake manifold 14 so that the flow rate of intake air entering the engine 12 is decreased. Generally, a correlation exists between turbocharger rotational speed and the flow rate of intake air entering the engine, and the target flow rate of intake air entering the engine can thus be mapped to a corresponding target turbocharger rotational speed. In this embodiment, the operating condition that is indicative of the intake air flow rate being sufficiently close to the target flow rate is thus an indirect indicator of the intake air flow rate and corresponds to a measured value of the turbocharger rotational speed being sufficiently close to a target turbocharger speed.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A method of controlling a flow of intake air entering an internal combustion engine, the method comprising:

diverting at least some of the intake air away from the engine in response to detection of a first operating condition that is indicative of a minimum engine fueling rate, monitoring a second operating condition that is indicative of a flow rate of the intake air entering the engine, and discontinuing diverting at least some of the intake air away from the engine if the second operating condition indicates that the flow rate of the intake air entering the engine is within a threshold value of a target flow rate.

2. The method of claim 1 further comprising a flow diverter valve having an inlet in fluid communication with one of an intake manifold of the engine and an air intake conduit that is fluidly coupled between the intake manifold and a compressor of a turbocharger, and an outlet that is not in fluid communication with the air intake conduit or the intake manifold, wherein diverting at least some of the intake air away from the engine comprises controlling the flow diverter valve to at least partially open an air flow path between the inlet and the outlet.

3. The method of claim 2 wherein the flow diverter valve is disposed in-line with the air intake conduit, and wherein discontinuing diverting at least some of the intake air away from the engine comprises controlling the flow diverter valve to close the air flow path between the inlet and the outlet so that air does not flow through the outlet of the flow diverter valve.

4. The method of claim 2 further comprising an air diverting conduit having one end fluidly coupled to one of the air intake conduit and the intake manifold, wherein the flow diverter valve is disposed in-line with the air diverting conduit, and wherein discontinuing diverting at least some of the intake air away from the engine comprises controlling the flow diverter valve to close the air path between the inlet and the outlet so that air does not flow from the one of the intake conduit and the intake manifold through the air diverting conduit.

5. The method of claim 1 wherein the first operating condition corresponds to disengagement of a clutch positioned between the engine and a transmission having a number of manually selectable gear ratios.

6. The method of claim 5 further comprising an engine speed sensor configured to produce an engine speed signal corresponding to a rotational speed of the engine, an intake manifold temperature sensor configured to produce a temperature signal corresponding to a temperature of the intake air entering the engine and an intake manifold pressure sensor configured to produce a pressure signal corresponding to air pressure within an intake manifold of the engine, wherein monitoring the second operating condition comprises continually computing an estimated flow rate of the intake air entering the engine as a function of the engine speed signal, the temperature signal and the pressure signal, and wherein the second operating condition indicates that the flow rate of the intake air entering the engine is within the threshold value of a target flow rate if the estimated flow rate of the intake air entering the engine is within the threshold value of the target flow rate.

7. The method of claim 6 further comprising an exhaust gas recirculation (EGR) system comprising an EGR conduit fluidly coupled between an exhaust manifold of the engine and the intake manifold, a flow restriction having an inlet and an outlet positioned in-line with the EGR conduit and a differential pressure sensor configured to produce a differential pressure signal corresponding a differential pressure between the inlet and the outlet of the flow restriction, and wherein computing an estimated flow rate of the intake air entering the engine comprises computing the estimated flow rate of the intake air entering the engine further as a function of the differential pressure signal.

8. The method of claim 5 further comprising a mass flow rate sensor configured to produce a mass flow rate signal corresponding to the flow rate of the intake air entering the engine, wherein monitoring the second operating condition comprises monitoring the mass flow rate signal, and wherein the second operating condition indicates that the flow rate of the intake air entering the engine is within the threshold value of the target flow rate if the monitored mass flow rate signal indicates that the flow rate of the intake air entering the engine is within the threshold value of the target flow rate.

9. The method of claim 5 further comprising a turbocharger speed sensor configured to produce a turbocharger speed signal corresponding to a rotational speed of a turbocharger operatively coupled to the engine, wherein monitoring the second operating condition comprises monitoring the turbocharger speed signal, and wherein the second operating condition indicates that the flow rate of the intake air entering the engine is within the threshold value of the target flow rate if the monitored turbocharger speed signal indicates that the turbocharger rotational speed is within a threshold speed value of a target turbocharger speed.

10. The method of claim 1 further comprising a fuel system operatively coupled to the engine, and wherein the first operating condition corresponds to a requested fuel value being at or near the minimum engine fueling rate, the requested fuel value corresponding to a flow rate fuel requested to be delivered by the fuel system to the engine.

11. The method of claim 10 further comprising an engine speed sensor configured to produce an engine speed signal corresponding to a rotational speed of the engine, an intake manifold temperature sensor configured to produce a temperature signal corresponding to a temperature of the intake air entering the engine and an intake manifold pressure sensor configured to produce a pressure signal corresponding to air pressure within an intake manifold of the engine, wherein monitoring the second operating condition comprises continually computing an estimated flow rate of the intake air entering the engine as a function of the engine speed signal, the temperature signal and the pressure signal, and wherein the second operating condition indicates that the flow rate of the intake air entering the engine is within the threshold value of a target flow rate if the estimated flow rate of the intake air entering the engine is within the threshold value of the target flow rate.

12. The method of claim 11 further comprising an exhaust gas recirculation (EGR) system comprising an EGR conduit fluidly coupled between an exhaust manifold of the engine and the intake manifold, a flow restriction having an inlet and an outlet positioned in-line with the EGR conduit and a differential pressure sensor configured to produce a differential pressure signal corresponding a differential pressure between the inlet and the outlet of the flow restriction, and wherein computing an estimated flow rate of the intake air entering the engine comprises computing the estimated flow rate of the intake air entering the engine further as a function of the differential pressure signal.

13. The method of claim 10 further comprising a mass flow rate sensor configured to produce a mass flow rate signal corresponding to the flow rate of the intake air entering the engine,
  wherein monitoring the second operating condition comprises monitoring the mass flow rate signal,
  and wherein the second operating condition indicates that the flow rate of the intake air entering the engine is within the threshold value of the target flow rate if the monitored mass flow rate signal indicates that the flow rate of the intake air entering the engine is within the threshold value of the target flow rate.

14. The method of claim 10 further comprising a turbocharger speed sensor configured to produce a turbocharger speed signal corresponding to a rotational speed of a turbocharger operatively coupled to the engine,
  wherein monitoring the second operating condition comprises monitoring the turbocharger speed signal,
  and wherein the second operating condition indicates that the flow rate of the intake air entering the engine is within the threshold value of the target flow rate if the monitored turbocharger speed signal indicates that the turbocharger rotational speed is within a threshold speed value of a target turbocharger speed.

15. The method of claim 1 further comprising an accelerator pedal that is manually actuatable between a reference position, corresponding to the minimum engine fueling rate, and a fully depressed position, corresponding to a maximum engine fueling rate,
  wherein the first operating condition corresponds to the reference position of the accelerator pedal.

16. The method of claim 15 further comprising an engine speed sensor configured to produce an engine speed signal corresponding to a rotational speed of the engine, an intake manifold temperature sensor configured to produce a temperature signal corresponding to a temperature of the intake air entering the engine and an intake manifold pressure sensor configured to produce a pressure signal corresponding to air pressure within an intake manifold of the engine,
  wherein monitoring the second operating condition comprises continually computing an estimated flow rate of the intake air entering the engine as a function of the engine speed signal, the temperature signal and the pressure signal,
  and wherein the second operating condition indicates that the flow rate of the intake air entering the engine is within the threshold value of a target flow rate if the estimated flow rate of the intake air entering the engine is within the threshold value of the target flow rate.

17. The method of claim 16 further comprising an exhaust gas recirculation (EGR) system comprising an EGR conduit fluidly coupled between an exhaust manifold of the engine and the intake manifold, a flow restriction having an inlet and an outlet positioned in-line with the EGR conduit and a differential pressure sensor configured to produce a differential pressure signal corresponding a differential pressure between the inlet and the outlet of the flow restriction,
  and wherein computing an estimated flow rate of the intake air entering the engine comprises computing the estimated flow rate of the intake air entering the engine further as a function of the differential pressure signal.

18. The method of claim 15 further comprising a mass flow rate sensor configured to produce a mass flow rate signal corresponding to the flow rate of the intake air entering the engine,
  wherein monitoring the second operating condition comprises monitoring the mass flow rate signal,
  and wherein the second operating condition indicates that the flow rate of the intake air entering the engine is within the threshold value of the target flow rate if the monitored mass flow rate signal indicates that the flow rate of the intake air entering the engine is within the threshold value of the target flow rate.

19. The method of claim 15 further comprising a turbocharger speed sensor configured to produce a turbocharger speed signal corresponding to a rotational speed of the turbocharger,
  wherein monitoring the second operating condition comprises monitoring the turbocharger speed signal,
  and wherein the second operating condition indicates that the flow rate of the intake air entering the engine is within the threshold value of the target flow rate if the monitored turbocharger speed signal indicates that the rotational speed of the turbocharger is within a threshold speed value of a target turbocharger speed.

20. The method of claim 1 further comprising an engine compression brake operatively coupled to the engine,
  and wherein the first operating condition corresponds to activation of the engine compression brake.

21. The method of claim 20 further comprising an engine speed sensor configured to produce an engine speed signal corresponding to a rotational speed of the engine, an intake manifold temperature sensor configured to produce a temperature signal corresponding to a temperature of the intake air entering the engine and an intake manifold pressure sensor configured to produce a pressure signal corresponding to air pressure within the intake manifold of the engine,
  wherein monitoring the second operating condition comprises continually computing an estimated flow rate of the intake air entering the engine as a function of the engine speed signal, the temperature signal and the pressure signal,
  and wherein the second operating condition indicates that the flow rate of the intake air entering the engine is within the threshold value of a target flow rate if the estimated flow rate of the intake air entering the engine is within the threshold value of the target flow rate.

22. The method of claim 21 further comprising an exhaust gas recirculation (EGR) system comprising an EGR conduit fluidly coupled between an exhaust manifold of the engine and the intake manifold, a flow restriction having an inlet and an outlet positioned in-line with the EGR conduit and a differential pressure sensor configured to produce a differential pressure signal corresponding a differential pressure between the inlet and the outlet of the flow restriction,
  and wherein computing an estimated flow rate of the intake air entering the engine comprises computing the estimated flow rate of the intake air entering the engine further as a function of the differential pressure signal.

23. The method of claim 20 further comprising a mass flow rate sensor configured to produce a mass flow rate signal corresponding to the flow rate of the intake air entering the engine,
  wherein monitoring the second operating condition comprises monitoring the mass flow rate signal,
  and wherein the second operating condition indicates that the flow rate of the intake air entering the engine is within the threshold value of the target flow rate if the monitored mass flow rate signal indicates that the flow rate of the intake air entering the engine is within the threshold value of the target flow rate.

24. The method of claim 20 further comprising a turbocharger speed sensor configured to produce a turbocharger speed signal corresponding to a rotational speed of the turbocharger, wherein monitoring the second operating condition comprises monitoring the turbocharger speed signal, and wherein the second operating condition indicates that the flow rate of the intake air entering the engine is within the threshold value of the target flow rate if the monitored turbocharger speed signal indicates that the turbocharger rotational speed is within a threshold speed value of a target turbocharger speed.

25. The method of claim 1 further comprising a fuel system operatively coupled to the engine, and wherein the first operating condition corresponds to a requested fuel value being at or near a predefined engine fueling rate and a rate of change of the requested fueling rate being above a predefined fueling rate value, the requested fuel value corresponding to a flow rate fuel requested to be delivered by the fuel system to the engine.

26. The method of claim 25 further comprising an engine speed sensor configured to produce an engine speed signal corresponding to a rotational speed of the engine, an intake manifold temperature sensor configured to produce a temperature signal corresponding to a temperature of the intake air entering the engine and an intake manifold pressure sensor configured to produce a pressure signal corresponding to air pressure within an intake manifold of the engine, wherein monitoring the second operating condition comprises continually computing an estimated flow rate of the intake air entering the engine as a function of the engine speed signal, the temperature signal and the pressure signal, and wherein the second operating condition indicates that the flow rate of the intake air entering the engine is within the threshold value of a target flow rate if the estimated flow rate of the intake air entering the engine is within the threshold value of the target flow rate.

27. The method of claim 26 further comprising an exhaust gas recirculation (EGR) system comprising an EGR conduit fluidly coupled between an exhaust manifold of the engine and the intake manifold, a flow restriction having an inlet and an outlet positioned in-line with the EGR conduit and a differential pressure sensor configured to produce a differential pressure signal corresponding a differential pressure between the inlet and the outlet of the flow restriction, and wherein computing an estimated flow rate of the intake air entering the engine comprises computing the estimated flow rate of the intake air entering the engine further as a function of the differential pressure signal.

28. The method of claim 2 wherein monitoring a second operating condition that is indicative of a flow rate of the intake air entering the engine comprises monitoring a pressure differential across the compressor of the turbocharger, and wherein discontinuing diverting at least some of the intake air away from the engine if the second operating condition indicates that the flow rate of the intake air entering the engine is within a threshold value of a target flow rate comprises controlling the flow diverter valve to close the air flow path between the inlet and outlet thereof when the pressure differential across the compressor is within a threshold value.

29. A system for controlling a flow of intake air entering an internal combustion engine, the system comprising:

an air intake conduit having one end fluidly coupled to an intake manifold of the engine and an opposite end fluidly coupled to a compressor of a turbocharger, a flow diverter valve having an inlet in fluid communication with one of the air intake conduit and the intake manifold, and an outlet that is not in fluid communication with the air intake conduit or the intake manifold, a valve actuator responsive to a close signal to close the flow diverter valve and to an open signal to at least partially open the flow diverter valve, and a control circuit including a memory having instructions stored therein that are executable by the control circuit to divert at least some of the intake air away from the engine by producing the open signal upon detection of a first operating condition that is indicative of a minimum engine fueling rate, monitoring a second operating condition that is indicative of a flow rate of the intake air entering the engine, and discontinuing diverting at least some of the intake air away from the engine by producing the close signal if the second operating condition indicates that the flow rate of the intake air entering the engine is within a threshold value of a target flow rate.

* * * * *